(12) United States Patent
Dixon

(10) Patent No.: US 6,275,704 B1
(45) Date of Patent: *Aug. 14, 2001

(54) MULTIPLE ACCESS COMMUNICATION SYSTEM WITH POLARIZED ANTENNAS

(75) Inventor: Robert C. Dixon, Palmer Lake, CO (US)

(73) Assignee: Xircom, Inc., Thousand Oaks, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/810,354

(22) Filed: Mar. 3, 1997

(51) Int. Cl.$^7$ .................................................. H04Q 7/20
(52) U.S. Cl. ........................... 455/446; 455/422; 455/562
(58) Field of Search ................................. 455/422, 446, 455/447, 448, 454, 562; 370/319, 320, 321, 328; 343/874, 875, 879, 890, 891, 893

(56) References Cited

U.S. PATENT DOCUMENTS

| | | | |
|---|---|---|---|
| 4,128,740 | * 12/1978 | Graziano | 455/562 |
| 4,688,210 | 8/1987 | Eizenhöfer et al. | 370/18 |
| 4,747,160 | * 5/1988 | Bossard | 455/422 |
| 4,797,947 | 1/1989 | Labedz | 455/33 |
| 4,833,702 | 5/1989 | Shitara et al. | 379/60 |
| 4,878,238 | 10/1989 | Rash et al. | 379/62 |
| 4,901,307 | 2/1990 | Gilhousen et al. | 370/18 |
| 4,984,247 | 1/1991 | Kaufmann et al. | 375/1 |
| 5,042,050 | 8/1991 | Owen | 375/1 |
| 5,101,501 | 3/1992 | Gilhousen et al. | 455/33 |
| 5,267,261 | 11/1993 | Blakeney, II et al. | 375/1 |
| 5,392,459 | 2/1995 | Baba et al. | 455/69 |
| 5,455,822 | 10/1995 | Dixon et al. | 370/18 |
| 5,603,083 | * 2/1997 | Lee | 455/562 |
| 5,668,610 | * 9/1997 | Bossard et al. | 455/422 |
| 5,722,043 | * 2/1998 | Rappaport et al. | 455/447 |
| 5,724,666 | * 3/1998 | Dent | 455/562 |
| 5,745,858 | * 4/1998 | Sato et al. | 455/562 |
| 5,771,449 | * 6/1998 | Blasing et al. | 455/562 |
| 5,806,001 | * 9/1998 | Yokota | 455/562 |
| 5,838,670 | * 11/1998 | Billstrom | 370/328 |
| 5,903,826 | * 5/1999 | Nowak | 455/562 |
| 5,933,788 | * 8/1999 | Faerber et al. | 455/562 |

FOREIGN PATENT DOCUMENTS

| | | | |
|---|---|---|---|
| 9503652 | 2/1995 | (WO) | H04B/7/26 |
| 9506365 | 3/1995 | (WO) | H04B/7/04 |

* cited by examiner

*Primary Examiner*—Nay Maung
(74) *Attorney, Agent, or Firm*—Lyon & Lyon LLP

(57) ABSTRACT

A multiple access communication system comprising a plurality of cells, each cell comprising a plurality of sectors. A base station is located in each cell and has a plurality of antennas. Each antenna covers a sector of the cell and is associated with a polarization characteristic. In one embodiment, each cell has two sectors, and each sector facing a first direction has an antenna with a first polarization characteristic, while each sector facing a second, opposite direction has an antenna with a second polarization characteristic. In another embodiment, each cell is divided into four sectors generally arranged as quadrants. Two adjacent sectors have antennas with a first polarization characteristic, while the other two adjacent sectors have antennas with a second polarization characteristic. In a preferred embodiment, the first polarization characteristic is left hand circular polarization, and the second polarization characteristic is right hand circular polarization. Alternatively, vertically polarized antennas and horizontally polarized antennas may be used instead of circularly polarized antennas. Frequencies may be assigned to the cells in a three-frequency reuse pattern or a seven-frequency reuse pattern, or in any other suitable arrangement.

5 Claims, 4 Drawing Sheets

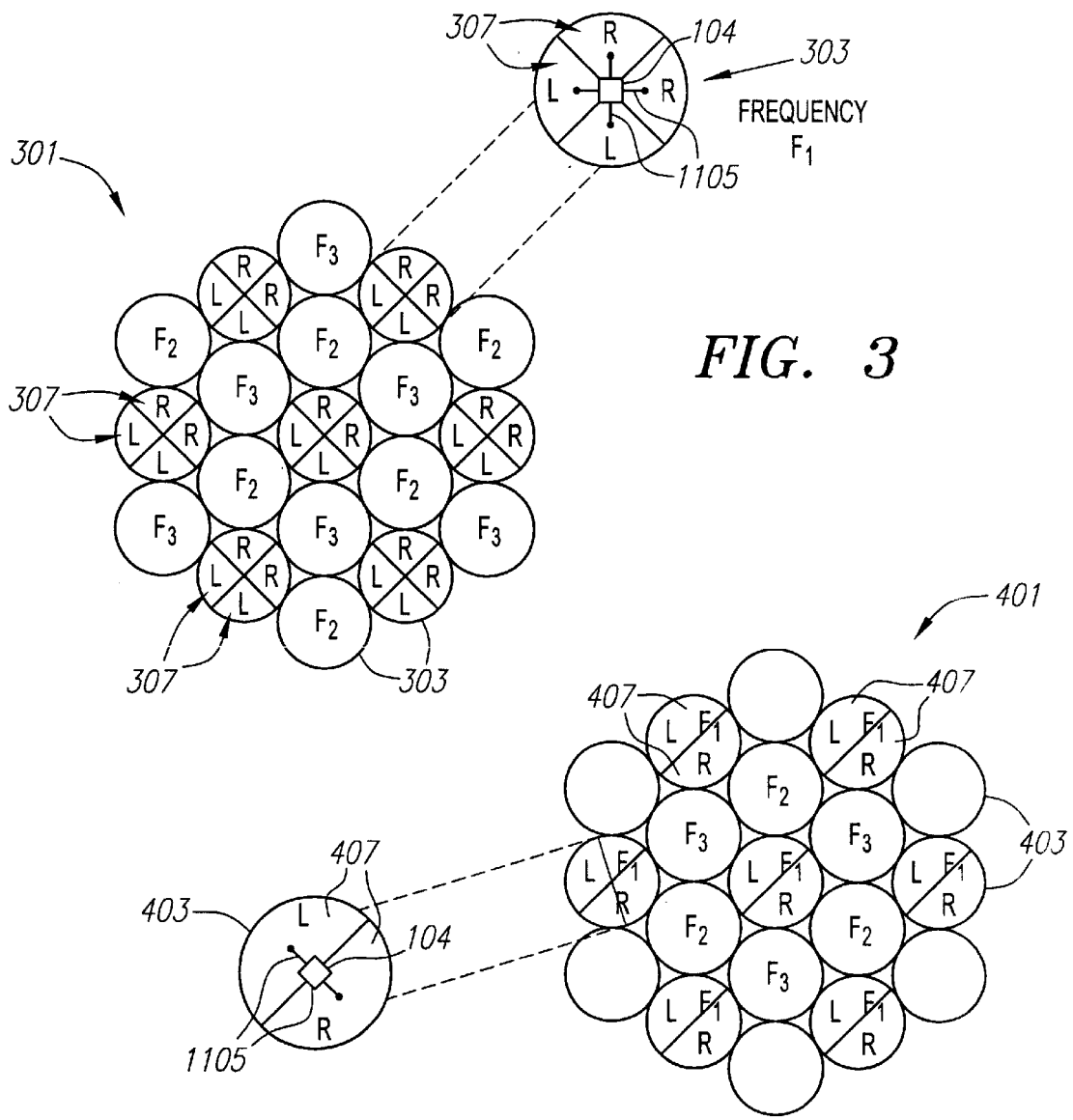
FIG. 3
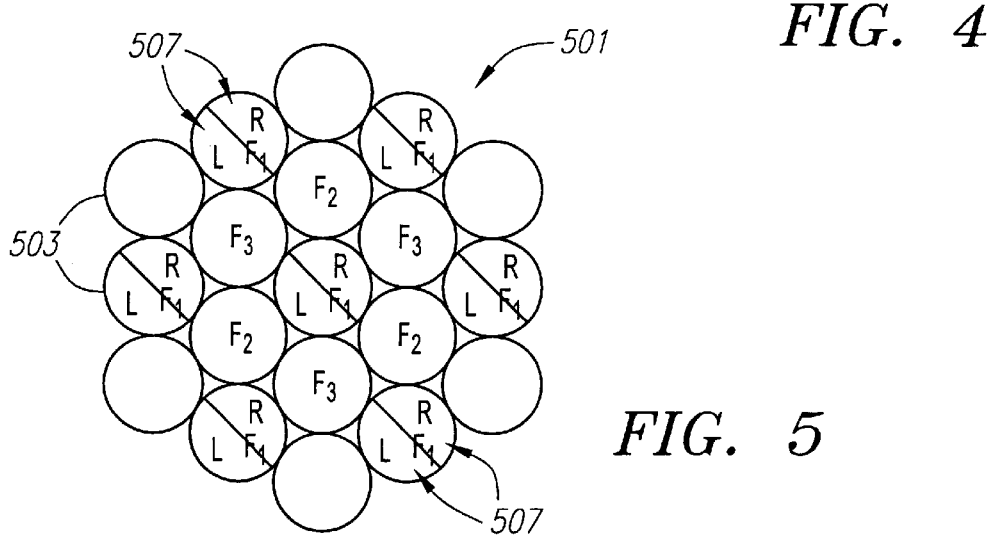
FIG. 4
FIG. 5

VERTICAL

HORIZONTAL

MULTIPLE ACCESS COMMUNICATION SYSTEM WITH POLARIZED ANTENNAS

BACKGROUND OF THE INVENTION

1. Field of the Invention

The field of the present invention relates to communications and, more specifically, to a multiple user communication system with polarized antennas.

2. Description of the Related Art

In a wireless communication system it is generally necessary for a receiver to distinguish between those signals in its operating region that it should accept and those it should reject. A common method in the art is frequency division (FDMA), in which a separate frequency is assigned to each communication channel. Another common method in the art is time division (TDMA), in which a separate time slot in a periodic time frame is assigned to each communication channel. Yet another method in the art is code division (CDMA), in which a separate spreading code is assigned to each communication channel.

One problem which has arisen in the art is that contiguous coverage of a large area using radio communication has required a cellular configuration with a large number of cells, and thus with only a small number of frequencies available per cell. In an FDMA system, all relatively proximate cells, not just adjacent cells, must operate on different frequencies, and frequencies may be reused only sufficiently far away that stations using those frequencies no longer interfere. For example, in practical FDMA systems, with homogenous conditions and equal-power transmitters, the distance between perimeters of like-frequency cells should usually be at least two to three times the diameter of a single cell. This requirement had led to a seven-cell configuration now in common use for FDMA cellular networks.

While it is desirable to space same frequency cells as far apart as possible in order to minimize interference, the amount of distance that same frequency cells can be separated is limited because the number of frequencies available is limited. This is because the fewer available frequencies, the fewer intermediate cells can be placed between same frequency cells. Different codes have been employed using CDMA techniques in order to reduce the intercell interference in such systems, and thereby reduce the number of frequencies needed and/or the distance of separation between same frequency cells. However, codes may have limited orthogonality (e.g., where a large number of fixed or short length codes are needed), which means that even in the best case they contribute noise to adjacent cells using the same frequency.

Accordingly, it would be advantageous to provide a wireless communication system which allows for a reduced number of required frequencies, or a reduced distance between same frequency cells, or both. It would further be advantageous to provide such a system not requiring the use of CDMA to reduce intercell interference, but which may nevertheless be used in conjunction with CDMA to further limit the number of required frequencies and/or minimize the required distance between same frequency cells.

SUMMARY OF THE INVENTION

The invention comprises in one aspect a multiple access communication system comprising a plurality of cells, each cell comprising a plurality of sectors. A base station is located in each cell and has a plurality of antennas. Each antenna covers one sector in the cell and is associated with a polarization characteristic. In one embodiment, each cell comprises two sectors in the same pattern or orientation—e.g., each cell is bisected at the same angle into two sectors. Each sector oriented in a first direction has an antenna with a first polarization characteristic, while each sector oriented in a second, opposite direction has an antenna with a second polarization characteristic. In a preferred embodiment, the first polarization characteristic is left hand circular polarization, and the second polarization characteristic is right hand circular polarization.

In another embodiment, each cell is divided into four sectors generally arranged as quadrants. Two adjacent sectors in a cell have antennas with a first polarization characteristic, while the other two adjacent sectors in the cell have antennas with a second polarization characteristic. In a preferred embodiment, the first polarization characteristic is left hand circular polarization, and the second polarization characteristic is right hand circular polarization.

Alternatively, instead of using left hand or right hand circularly polarized antennas in either of the above embodiments, vertically polarized antennas and horizontally polarized antennas may be used.

In a particular embodiment, frequencies are assigned to the cells in a three-frequency reuse pattern such that no cell is assigned the same frequency as any of its adjacent cells. In an alternative embodiment, frequencies are assigned in a seven-frequency reuse pattern such that no cell is assigned the same frequency as any of its two closest neighboring cells.

Further variations and embodiments are also disclosed in more detail herein.

BRIEF DESCRIPTION OF THE DRAWINGS

The various objects, features and advantages of the present invention may be better understood by examining the Detailed Description of the Preferred Embodiments found below, together with the appended figures, wherein:

FIG. 3 is a diagram of preferred embodiment of the present invention using circularly polarized antennas and a four sector per cell layout.

FIG. 4 is a diagram of another embodiment of the present invention using circularly polarized antennas and a two sector per cell layout.

FIG. 5 is a diagram of an alternative embodiment of the present invention using circularly polarized antennas and a two sector per cell layout.

DETAILED DESCRIPTION OF THE PREFERRED EMBODIMENTS

Figure 1:
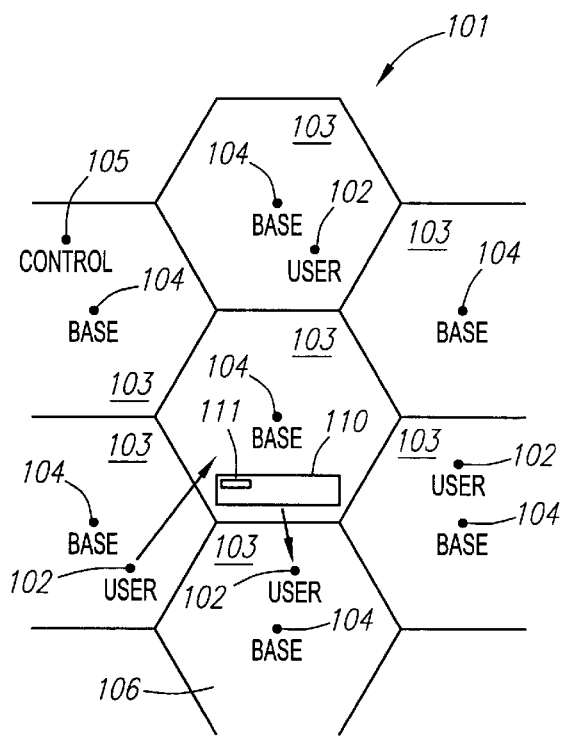
FIG. 1 is a diagram of a pattern of cells in a wireless communication system.

FIG. 1 is a diagram of a pattern of cells in a wireless communication system 101 for communication among a plurality of user stations 102. The wireless communication system 101 of FIG. 1 includes a plurality of cells 103, each with a base station 104, typically located at the center of the cell 103. Each station (both the base stations 104 and the user stations 102) generally comprises a receiver and a transmitter.

In a preferred embodiment, a control station 105 (also comprising a receiver and a transmitter) manages the resources of the system 101. The control station 105 assigns the base station 104 transmitters and user station 102 transmitters in each cell 103 a spread-spectrum code for modulating radio signal communication in that cell 103. Accordingly, radio signals used in that cell 103 are spread across a bandwidth sufficiently wide that both base station 104 receivers and user station 102 receivers in an adjacent cell 103 may distinguish communication which originates in the first cell 103 from communication which originates in the adjacent cell 106.

Figure 2:
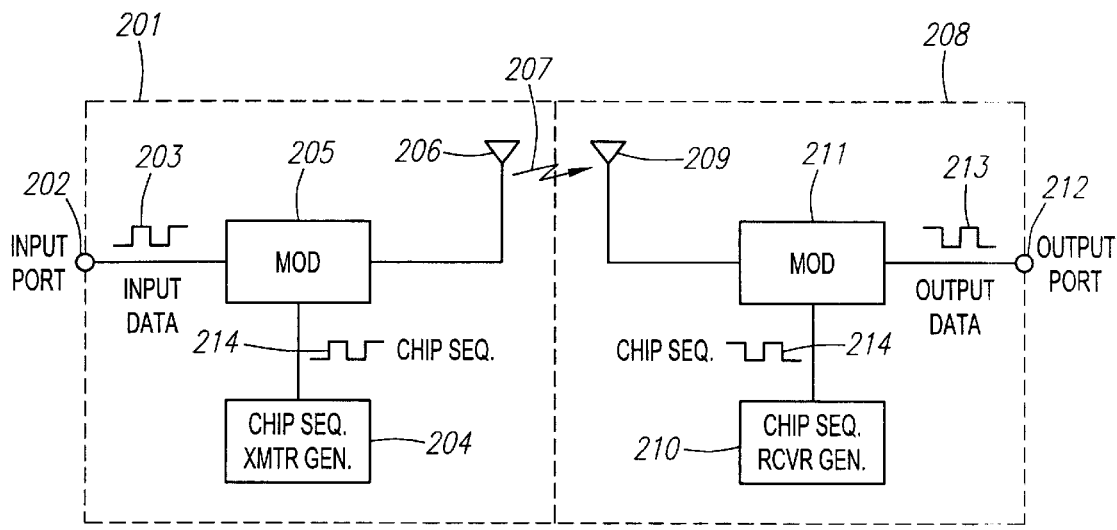
FIG. 2 is a block diagram of a spread spectrum communication system.

FIG. 2 is a block diagram of an exemplary spread spectrum communication system as may be employed for spreading and despreading signals in the communication system of FIG. 1. In FIG. 2, a spread-spectrum transmitter 201 comprises an input port 202 for input data 203, a chip sequence transmitter generator 204, a modulator 205, and a transmitting antenna 206 for transmitting a spread-spectrum signal 207. A spread-spectrum receiver 208 comprises a receiver antenna 209, a chip sequence receiver generator 210, a demodulator 211, and an output port 212 for output data 213. In operation, a single chip sequence 214 is identically generated by both the transmitter generator 204 and the receiver generator 210, and appears essentially random to others not knowing the spreading code upon which it is based. The spread-spectrum signal 207 is despread with demodulator 211 by correlating the received signal with a locally generated version of the chip sequence 214. Spread spectrum communication techniques are further described in, e.g., Robert C. Dixon, *Spread Spectrum Systems with Commercial Applications* (John Wiley & Sons, 3d ed. 1994).

In a preferred embodiment, each transmitting antenna 206 and receiver antenna 209 is selected to have a particular polarization characteristic and a particular orientation with respect to antennas in other cells. A first embodiment of the invention is shown in FIG. 3, which is a diagram of a geographic region 301 divided into a plurality of cells 303. Each cell 303 is assumed to have a base station 104 located within the cell 303, typically at its center. The transmitting antenna 206 and receiver antenna 209 at a particular base station 104 may be the same antenna. A diplexer may be used at the base station 104 to allow simultaneous transmission and reception of communication signals using the same antenna.

In FIG. 3, each cell 303 is assigned a frequency (or frequency group) from a set of frequencies (or frequency groups). FIG. 3 shows, for example, a three-cell repeating pattern based on different frequencies F1, F2 and F3, wherein no cell 303 utilizes the same frequency as any of its adjacent cells. Such a frequency reuse pattern is generally known in the art and is described, for example, in U.S. Pat. No. 4,355,411 issued to Reudink et al., which patent is hereby incorporated by reference as if fully set forth herein. Each cell 303 is divided into a plurality of sectors 307. In FIG. 3, only those cells 303 using frequency F1 are shown divided into sectors 307; a similar division into sectors is also made with respect to cells 303 using either frequencies F2 or frequency F3.

Figure 11:
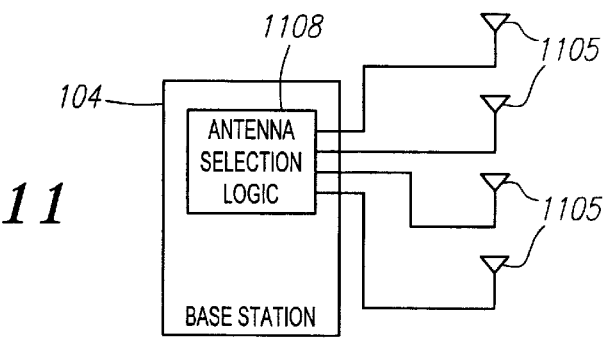
FIG. 11 is a block diagram of a base station configured with a plurality of antennas for coverage over a plurality of sectors within a given cell.

A base station 104 is provided with a plurality of antennas 1105, such as shown in FIG. 11. For a base station 104 within a given cell 303, a different antenna 1105 is provided for each sector 307 of coverage. In FIG. 3, for example, the cells 303 are divided into four sectors 307, so four different antennas 1105 would be employed by the base station 104. Antenna selection logic 1108 selects an antenna 1105 (or antennas) over which to transmit and receive signals. An antenna 1105 may, for example, be selected according to which sector 307 a user station 102 transmitting or receiving information is located in. In a preferred embodiment, signals are sent and received over the same frequency F1 for all of the sectors 307 in a given cell 303.

In a time division multiple access (TDMA) system, a different antenna 1105 may be selected during each of a plurality of time slots. Information regarding TDMA and combined TDMA/CDMA or TDMA/CDMA/FDMA systems may be found, e.g., in copending U.S. patent application Ser. No. 08/161,187 filed Dec. 3, 1993 in the name of inventors Robert C. Dixon et al., entitled "Method and Apparatus for Establishing Spread Spectrum Communication," and copending U.S. patent application Ser. No. 08/284,053 filed Aug. 1, 1994 in the name of inventors Gary B. Anderson, Ryan N. Jensen, Bryan K. Petch, and Peter O. Peterson, entitled "PCS Pocket Phone/Microcell Over-Air Protocol," each of which applications is incorporated by reference as if fully set forth herein.

Each antenna 1105 is oriented to cover one of the sectors 307 of the cell 303 in which it is deployed. Each antenna 1105 is also associated with a polarization characteristic, such as right hand circular polarization, left hand circular polarization, vertical polarization, or horizontal polarization, as more specifically described herein. In a preferred embodiment, each of the antennas 1105 are circularly polarized, with selected ones of the circularly polarized antennas 1105 having right hand circular polarization, and selected others of the antennas 1105 having left hand circular polarization.

Figure 9A:
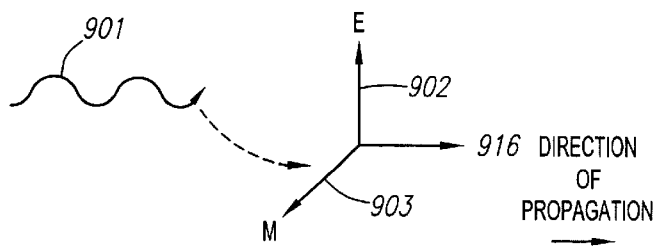
FIGS. 9A and 9B are waveform diagrams illustrating circular polarization.

Aspects of circular polarization may be explained in more detail with reference to FIGS. 9A and 9B, which are waveform diagrams relating to propagation of electromagnetic or radio waves. In general, as shown in FIG. 9A, a radio wave 901 is composed of an electric field 902 and a magnetic field 903 at right angles to each other and to the direction of propagation 916 of the wave 901. When the electrical component 902 of the radio wave 901 is horizontal, as depicted with components 905 and 907 of FIG. 9B, then the wave 901 is said to be horizontally polarized. When the electrical component 902 is vertical, as depicted with components 904, 906 and 908 of FIG. 9B, then the wave 901 is said to be vertically polarized.

Figure 9B:
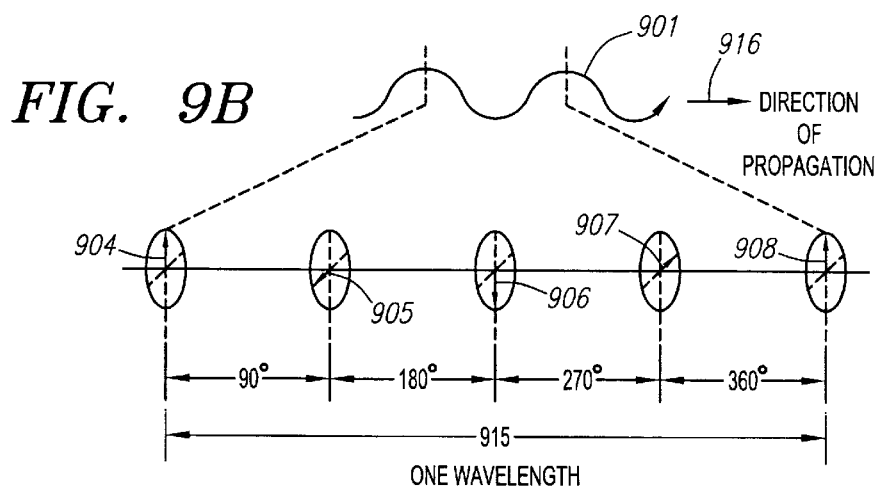

In a circularly polarized radio wave 901, as shown in FIG. 9B, as the radio wave 901 propagates the polarity of the electric field 902 and magnetic field 903 of the wave 901 rotate along the axis of propagation at a speed defined by the carrier frequency $f_c$. The amount of rotation is 360 degrees over a single period.

The ratio of the larger of the horizontal electrical component $E_H$ (e.g., component 905 or 907) and the vertical electrical component $E_v$ (e.g., component 904, 906 or 908) to the smaller thereof is known as the axial ratio. Where the axial ratio is one, or 0 dB, the circular polarization is considered ideal. Axial ratios over 4.9 dB are considered to represent elliptically polarized signals, a hybrid form of circularly polarized signals and not as desirable. Where the electrical component 902 rotates in a clockwise direction as viewed from the source of the wave 901, the polarization is said to be right hand circular polarization. Conversely, where the electrical component 902 rotates in a counter-clockwise direction when viewed from the source of the wave 901, the polarization is said to be left hand circular polarization.

Antennas are known in the art particularly adapted for transmitting and receiving signals with either left hand or right hand circular polarization. When a signal is transmitted using an antenna 1105 having a left hand circular polarization, the transmitted signal has a left hand circular polarization characteristic. Similarly, when a signal is transmitted using an antenna 1105 having a right hand circular polarization, the transmitted signal has a right hand circular polarization characteristic. A left hand circularly polarized antenna rejects to a substantial degree signals transmitted with right hand circular polarization, while a right hand circularly polarized antenna likewise rejects to a substantial degree signals transmitted with left hand circular polarization. In an illustrative system, the amount of rejection is on the order of 20 dB. This amount of rejection is roughly equivalent to moving an interferer further away in distance by as much as a factor of ten.

Figure 10A:
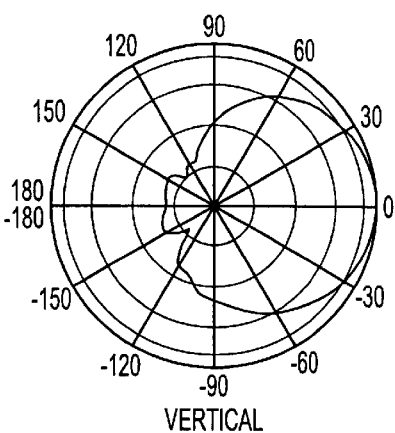
FIGS. 10A and 10B are radiation pattern diagrams of a preferred left hand circularly polarized antenna and a preferred right hand circularly polarized antenna, respectively.
Figure 10B:
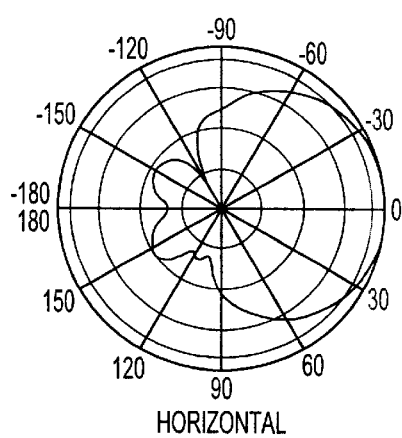

A preferred set of antennas is manufactured by Huber & Suhner AG under model numbers 1319.19.0004 (left hand circular polarization) and 1319.19.0005 (right hand circular polarization). These antennas are planar in shape and are constructed for a frequency range of about 1850 to 1990 megahertz. The '0004 model has a radiation pattern as shown in FIG. 10A, and the '0005 model has a radiation pattern as shown in FIG. 10B. Other suitable antennas are manufactured by Antennas America, including antennas with higher gain characteristics than the specific models mentioned above. The above identified antenna models are intended to be illustrative, and embodiments of the invention described herein will work with a variety of other antennas, and at a variety of other frequency ranges besides those specifically mentioned.

In the FIG. 3 embodiment, the sectors 307 for each cell 303 are configured in an identical layout in both number and orientation. Two adjacent sectors 307 in the cell 303, denoted by the reference "R" in FIG. 3, are covered by two dedicated base station antennas 1105 having right hand circular polarization with one antenna 1105 for each sector 307. The other two adjacent sectors 307 in the cell 303, denoted by the reference "L" in FIG. 3, are covered by two dedicated base station antennas 1105 having left hand circular polarization with one antenna 1105 for each sector 307. This pattern of sector orientation and relative antenna polarization is repeated for all the cells 303 having the same assigned frequency F1. Thus, in the FIG. 3 embodiment, for each right hand polarity antenna 1105 oriented in one direction over a sector 307, there is a left hand polarity antenna 1105 oriented in the opposite direction over a different sector 307 in the same cell 303.

The use of an alternating-polarity circular polarization antenna pattern such as shown in FIG. 3 results in a substantial effective interference rejection (e.g., about 20 dB) between base stations 104 operating on the same frequency F1 in nearby cells 303. As a result, cells 303 using the same frequency F1 may be placed closer together, or the number of cells 303 may be increased, without significant loss of performance from interference caused by same-frequency transmissions.

An additional benefit of using circular polarization in such a manner is that it reduces interference at a base station 104 arising from strong specular reflections of the base station's own signal. Specular reflections may occur when a transmitted signal encounters obstacles along the propagation path. Because such reflections occur in the opposite polarity as the transmitted signal, they tend to be rejected by the circularly polarized base station antennas 1105 having the same orientation as the transmitting antenna.

In a particular embodiment, user stations 102 employ linearly polarized antennas for transmission and reception of signals. To a user station 102 with linear antenna polarization, the use of circular polarization for the base station antennas 1105 is generally transparent. However, the user station 102 should not be oriented orthogonally with respect to the base station antenna 1105, nor should it be oriented in the same polarity as the base station antenna 1105, or else it will experience about a 3 dB loss relative to perfect antenna orientation. This amount of loss is nevertheless not as great as the 20 dB or larger loss that occurs when a linear base station antenna and a linear handset antenna are cross-polarized with respect to one another.

In the FIG. 3 embodiment, cell-to-cell interference from user stations 102 is not reduced as much as cell-to-cell interference from base stations 104. Typically, user stations 102 may experience about a 3 dB linear-to-circular rejection. However, user stations 102 embodied as mobile handsets tend to operate at much lower power than typical base stations 104, so that the primary interference source for same frequency cells are generally other base stations 104, not the user stations 102.

While the FIG. 3 embodiment is shown having four sectors 307 for each cell 303, the number of sectors 307 for a given communication system may depend upon a variety of design factors. Generally, the more sectors 307 per cell 303, the greater the system cost and complexity. The system may also be configured so that cells 303 of frequency F1 have a different number of sectors 307 or different layout of sectors 307 than cells 303 of frequencies F2 or F3; in a preferred embodiment, however, cells 303 of each frequency F1, F2 and F3 have the same number of sectors 307 as well as the same sector layout. Also, in a preferred embodiment, each sector 307 having the same relative location and orientation has same antenna polarization characteristic, regardless of whether the cell 303 in which the sector 307 is located is assigned frequency F1, F2 or F3. Sectors 307 having the same polarity characteristic in a given cell 303 may overlap partially.

FIG. 4 is a diagram of an another embodiment in accordance with one or more aspects of the present invention. The FIG. 4 embodiment, like the FIG. 3 embodiment, utilizes right hand circularly polarized antennas and left hand circularly polarized antennas. Unlike FIG. 3, however, FIG. 4 depicts a two-sector 307 per cell 303 layout rather than a four-sector 307 per cell 303 layout.

In FIG. 4, a geographic region 401 is divided into a plurality of cells 403. Each cell 403 is assumed to have a base station 104 located within the cell 403, typically at its center. Each cell 403 is assigned a frequency (or frequency group) from a set of frequencies (or frequency groups). In the particular embodiment shown in FIG. 4, a repeating three-frequency reuse pattern of cells 403 is employed, the same as shown in FIG. 3, wherein no cell 403 is assigned the same frequency as any of its adjacent cells 403.

Each cell 403 is divided into a plurality of sectors 407. In FIG. 4, only those cells 403 using frequency F1 are shown divided into sectors 407; a similar division into sectors is also made with respect to cells 403 using frequencies F2 and F3. Each base station 104 is provided with a plurality of antennas 1105 (see FIG. 11), and a different antenna 1105 is provided for each sector 407 of coverage within a given cell 403. In FIG. 4, the cells 403 are each divided into two sectors 407, so that two different antennas 1105 would be employed by the base station 104. As with the FIG. 3 embodiment, antenna selection logic 1108 selects which antenna 1105 over which to transmit and receive signals. In a preferred embodiment, signals are sent and received over the same frequency F1 for of the sectors 407 in a given cell 403.

The number and orientation of sectors 407 are preferably the same for each cell 403 in the FIG. 4 embodiment. Each antenna 1105 within a cell 403 is oriented to cover one of the sectors 407. Each antenna 1105 is also associated with a polarization characteristic. In a preferred embodiment, the first sector 407 in the cell 403, denoted by the reference "R", is covered by a dedicated base station antenna 1105 having right hand circular polarization, and the second sector 407 in the cell 403, denoted by the reference "L", is covered by a dedicated base station antenna 1105 having left hand circular polarization. The same pattern of sectors 407 and antenna polarization is repeated at least for all the cells 403 assigned the same frequency F1, F2 or F3. Thus, in the FIG. 4 embodiment, for each right hand polarity antenna 1105 looking one direction over a sector 407, a left hand polarity antenna 1105 looks the opposite direction in the same cell 407. For the geographic region 401 of FIG. 4, all right hand polarity antennas 1105 look one direction, while all left hand polarity antennas 1105 look the opposite direction.

The use of the alternating-polarity circular polarization antenna pattern of FIG. 4 is effective to reduce or eliminate interference between the base stations 104 operating on the same frequency F1, F2 or F3 in nearby cells 403. As a result, cells 403 using the same frequency F1, F2 or F3 may be placed closer together, or the number of cells 403 may be increased, without significant loss of performance from interference caused by same-frequency transmissions. Also, as noted with respect to the FIG. 3 embodiment, the use of circular polarization reduces interference at a base station 104 arising from specular reflections of its own signal.

FIG. 5 is a diagram of an alternative embodiment of the present invention using circularly polarized antennas in a two sector layout. In FIG. 5, a geographic region 501 is divided into a plurality of cells 503, each assumed to have a base station 104. Each cell 503 is assigned a frequency (or frequency group) from a set of frequencies (or frequency groups); for example, three frequencies. Like FIG. 4, each cell 503 is divided into two sectors 507. FIG. 5 is similar to FIG. 4 in all other respects, except that the direction of orientation of the sectors 507 differs.

Figure 6:
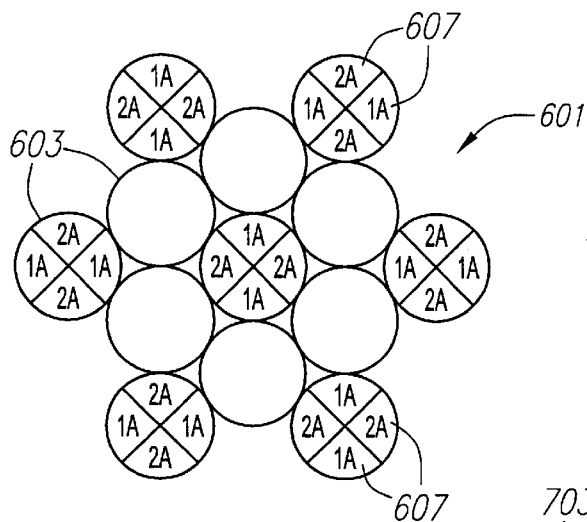
FIG. 6 is a diagram of another embodiment of the present invention using a four sector per cell layout and antennas with different polarization characteristics.

FIG. 6 is a diagram of another embodiment of the present invention. In FIG. 6, a geographic region 601 is divided into a plurality of cells 603, each assumed to have a base station 104. Each cell 603 is assigned a frequency (or frequency group) from a set of frequencies (or frequency groups); for example, in the particular embodiment shown in FIG. 6, three frequencies (or frequency groups) are reused in a repeating pattern similar to FIGS. 3, 4 and 5, and no cell 603 utilizes the same frequency as any of its adjacent cells 603. Like FIG. 3, each cell 603 is divided into a plurality of sectors 607, such as, e.g., four sectors 607. Each sector 607 is covered by at least one antenna 1105 associated with the base station 104.

While the FIG. 3 embodiment preferably uses circularly polarized antennas 1105, the FIG. 6 embodiment uses any antennas that have suitably complementary antenna polarization characteristics. Each sector 607 in the FIG. 6 embodiment is denoted with a number and a letter. The number signifies a polarization characteristic. Thus, the number "1" in the sectors 607 shown in FIG. 6 signifies a first polarization characteristic, and the number "2" signifies a second polarization characteristic, preferably complementary to the first polarization characteristic. The letter in each sector 607 signifies a frequency or frequency group. Thus, the letter "A" signifies a first frequency or group F1; the letter "B" signifies a second frequency of group F2; and the letter "C" signifies a third frequency of group F3.

In an exemplary embodiment, the first polarization characteristic is vertical polarization, and the second polarization characteristic is horizontal polarization. Thus, in this embodiment, antennas 1105 in sectors 607 denoted with a number "1" are vertically polarized, while antennas 1105 in sectors 607 denoted with a number "2" are horizontally polarized. Vertically polarized antennas and horizontally polarized antennas are known in the art. The particular cellular configuration shown in FIG. 6, like the FIG. 3 configuration, has advantageous interference rejection properties between base stations 104.

Figure 7:
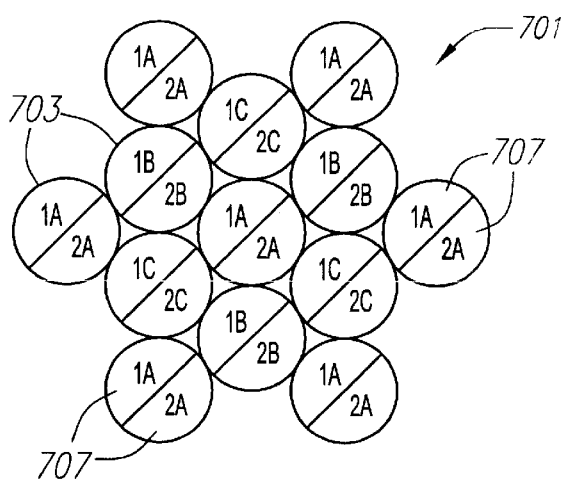
FIG. 7 is a diagram of another embodiment of the present invention using a two sector per cell layout and antennas with different polarization characteristics.

FIG. 7 is a diagram of alternative embodiment in accordance with one or more aspects of the present invention. In FIG. 7, a geographic region 701 is divided into a plurality of cells 703, each assumed to have a base station 104. Each cell 703 is assigned a frequency (or frequency group) from a set of frequencies (or frequency groups); for example, in the particular embodiment shown in FIG. 7, three frequencies (or frequency groups) F1, F2 and F3 are reused in a repeating pattern similar to the frequency pattern shown in FIGS. 3 through 6, and no cell 703 utilizes the same frequency as any of its adjacent cells 703. Each cell 703 is divided into a two sectors 707. Each sector 707 is covered by at least one antenna 1105 associated with the base station 104.

The FIG. 7 embodiment may be viewed as a more generalized version of the FIG. 4 embodiment. While the FIG. 4 embodiment preferably uses circularly polarized antennas 1105, the FIG. 7 embodiment uses any antennas that have suitably complementary antenna polarization characteristics. Each sector 707 in the FIG. 7 embodiment is denoted with a number and a letter. Like the FIG. 6 embodiment, the number signifies a polarization characteristic, and the letter signifies a frequency (or frequency group) assigned from among a plurality of frequencies (or frequency groups). In an exemplary embodiment, antennas 1105 in sectors 707 denoted with a number "1" are vertically polarized, while antennas 1105 in sectors 707 denoted with a number "2" are horizontally polarized.

Figure 8:
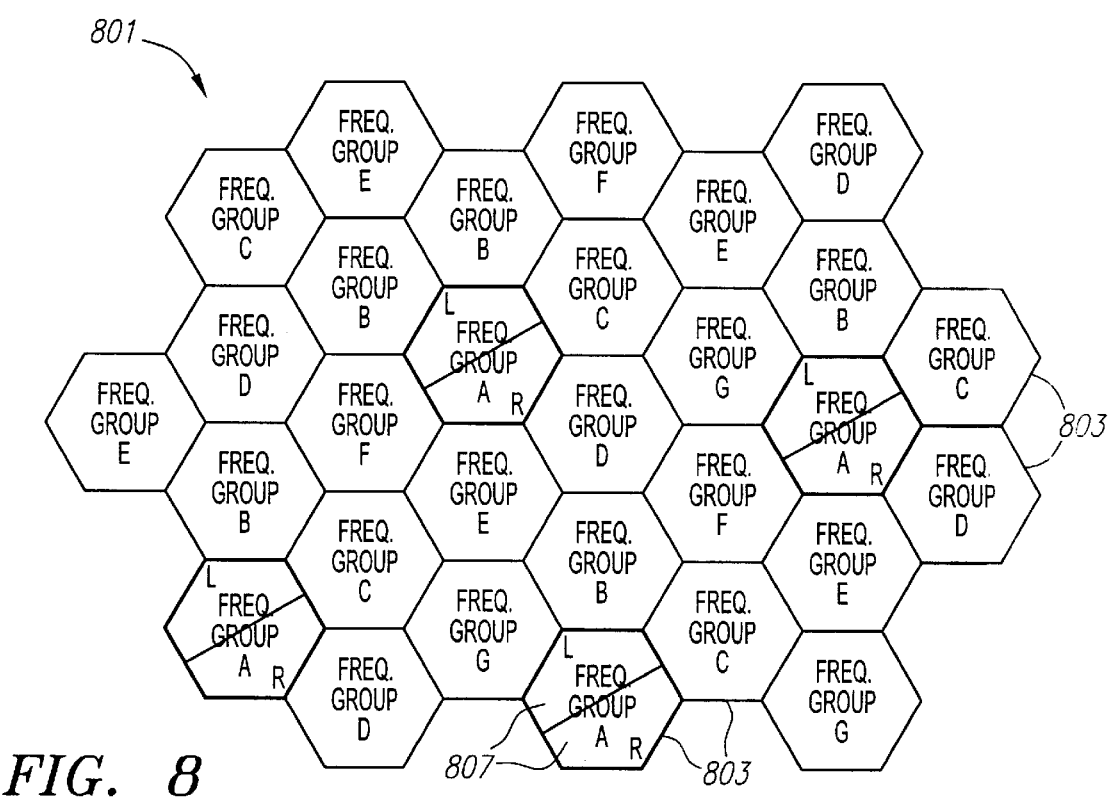
FIG. 8 is a diagram of another embodiment of the present invention using a seven-cell frequency reuse pattern and circularly polarized antennas in a two sector per cell layout.

FIG. 8 is a diagram of another embodiment in accordance with one or more aspects of the present invention. In FIG. 8, a geographic region 801 is divided into a plurality of cells 803, each assumed to have a base station 104, typically at its center. Each cell 803 is assigned a frequency (or frequency group) from a set of frequencies (or frequency groups). In the particular embodiment shown in FIG. 8, seven frequencies (or frequency groups) denoted by the letters A through G are reused in a repeating pattern such that no cell 803 utilizes the same frequency as any of its two nearest neighboring cells 803. A seven-cell repeating frequency pattern is generally known in the art of cellular communication and is described, e.g., in U.S. Pat. No. 4,198,677 to Cooper et al., which is hereby incorporated by reference as if fully set forth herein.

Each cell 803 is divided into a plurality of sectors 807, such as two sectors 807 as shown in the embodiment of FIG. 8. Each sector 807 is covered by at least one antenna 1105 associated with the base station 104. Each antenna 1105 is associated with a polarization characteristic. In a preferred embodiment, one sector 807, denoted by the reference "R", is covered by a dedicated base station antenna 1105 having right hand circular polarization, and another sector 807, denoted by the reference "L", is covered by a dedicated base station antenna 1105 having left hand circular polarization. The same sector and antenna polarization pattern is repeated for all the cells 803 having the same assigned frequency of frequencies A through G. Thus, in the embodiment shown in FIG. 8, all right hand polarity antennas 1105 look one direction, while all left hand polarity antennas 1105 look the opposite direction.

The FIG. 8 embodiment may also be configured with more than two sectors 807 per cell 803. Alternatively, or additionally, the FIG. 8 embodiment may be configured to use antennas 1105 with different but complementary polarity characteristics, such as vertical and horizontal polarity characteristics instead of circular polarization characteristics.

Alternative Embodiments

The present invention has been set forth in the form of its preferred embodiments. It is nevertheless intended that modifications to the disclosed communication techniques may be made by those skilled in the art without departing from the scope and spirit of the present invention. Moreover, such modifications are considered to be within the purview of the appended claims.

For example, in the embodiments of FIGS. 4 through 8, as noted previously with respect to FIG. 3, the number of sectors for each cell may vary depending upon the particular system requirements, and is not restricted to the specific embodiments depicted in the figures. Moreover, a system may be configured so that cells of different frequencies (or frequency groups) have different numbers of sectors per cell, or different patterns of sectors, or both. Also, sectors having the same polarity characteristic in a given cell may overlap partially.

Further, antenna diversity may be employed at the base station 104, such that multiple antennas 1105 may be used in each sector. In such a case, each of the antennas 1105 for a particular sector is placed at a different physical location with respect to the base station 104, so as to reduce the effects of multipath, fading, and interference. Antenna diversity is generally known in the art; particular antenna diversity techniques are disclosed, for example, in U.S. patent application Ser. No. 08/334,587 filed Nov. 3, 1994 in the name of inventor Logan Scott, and entitled "Antenna Diversity Techniques," which application is incorporated by reference as if fully set forth herein.

Other modifications and variations will be apparent to those skilled in the art, and it is understood that the scope of the invention is not to be limited by the specific embodiments disclosed herein, but only by the appended claims.

What is claimed is:

1. A wireless system, comprising:

a plurality of cells disposed in a repeating frequency reuse pattern, such that a frequency assigned to each cell is different from frequencies assigned to its immediately adjacent cells;

each of said cells including at least a first, second, third, and fourth sector;

a base station in each of said cells and having a plurality of antennas;

a first antenna associated with each of said first sectors in each of said plurality of cells;

a second antenna associated with each of said second sectors in each of said plurality of cells, said first antenna associated with a first polarization characteristic, and said second antenna associated with a second polarization characteristic, wherein said first and second sectors in adjacent cells are substantially adjacent to one another;

a third antenna associated with each of said third sectors in each of said plurality of cells; and a fourth antennas associated with each of said fourth sectors in each of said plurality of cells, said third antenna associated with said first polarization characteristic, and said fourth antenna associated with said second polarization characteristic, wherein said third and fourth sectors in adjacent cells are substantially adjacent to one another.

2. The multiple access communication system of claim 1 wherein said first sector, said second sector, said third sector and said fourth sector are arranged as quadrants of said cell, said first sector adjacent to said third sector, and said second sector adjacent to said fourth sector.

3. The multiple access communication system of claim 1 wherein said first antenna and said third antenna are left hand circularly polarized, and said second antenna and said fourth antenna are right hand circularly polarized.

4. A communication system, comprising:

a plurality of cells, each cell having a plurality of sectors, including at least a first, second, third, and fourth sector, each sector being oriented in an identical pattern, a plurality of base stations, at least one base station located in each of said plurality of cells, and each base station having a plurality of antennas, including a first antenna associated with each of said first sectors in each of said plurality of cells, a second antenna associated with each of said second sectors in each of said plurality of cells, a third antenna associated with each of said third sectors in each of said plurality of cells, and a fourth antenna associated with each of said fourth sectors in each of said plurality of cells; said first antenna and said third antenna having a first polarity, and said second antenna and said fourth antenna having a second polarity;

wherein said first and second sectors in adjacent cells are substantially adjacent to one another and said third and fourth sectors in adjacent cells are substantially adjacent to one another.

5. A method for configuring a communication system, comprising the steps of:

dividing a geographic region into a plurality of cells, including a first cell and a second cell;

assigning a first frequency to said first cell and a second frequency to said second cell;

dividing each of said cells into an identical pattern of sectors, comprising at least a first, second, third, and fourth sector, wherein said first and second sectors in adjacent cells are substantially adjacent to one another and said third and fourth sectors in adjacent cells are substantially adjacent to one another;

locating a base station in each of said cells, each base station having a plurality of antennas, including at least a first antenna associated with each of said first sectors in each of said plurality of cells, a second antenna associated with each of said second sectors in each of said plurality of cells, a third antenna associated with each of said third sectors in each of said plurality of cells, and a fourth antenna associated with each of said fourth sectors in each of said plurality of cells having a second polarization characteristic; and selecting a first polarity for said first antennas and said third antennas, and selecting a second polarity for said second antennas and said fourth antennas.

* * * * *